United States Patent
Chen

(10) Patent No.: US 12,277,698 B2
(45) Date of Patent: Apr. 15, 2025

(54) CHECKING MECHANISM FOR WORKSHOP SECURITY AND METHOD FOR SECURITY INSPECTION

(71) Applicant: TRIPLE WIN TECHNOLOGY(SHENZHEN) CO.LTD., Shenzhen (CN)

(72) Inventor: Xiao-Bo Chen, Shenzhen (CN)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 369 days.

(21) Appl. No.: 17/887,604

(22) Filed: Aug. 15, 2022

(65) Prior Publication Data
US 2023/0058003 A1 Feb. 23, 2023

(30) Foreign Application Priority Data
Aug. 18, 2021 (CN) .......................... 202110951180.1

(51) Int. Cl.
| G08B 21/18 | (2006.01) |
| G06T 7/00 | (2017.01) |
| G06T 7/70 | (2017.01) |

(52) U.S. Cl.
CPC .............. G06T 7/0008 (2013.01); G06T 7/70 (2017.01); G08B 21/18 (2013.01); *G06T 2207/30232* (2013.01)

(58) Field of Classification Search
None
See application file for complete search history.

(56) References Cited

U.S. PATENT DOCUMENTS

| 5,393,937 A | * | 2/1995 | Etherington | .......... | E21F 13/025 |
| | | | | | 177/141 |
| 2019/0059644 A1 | * | 2/2019 | Nelson | .................. | A47J 36/321 |
| 2024/0070910 A1 | * | 2/2024 | Yoshida | .................... | G06T 7/11 |

FOREIGN PATENT DOCUMENTS

| CN | 104375491 A | | 2/2015 |
| CN | 106132831 A | | 11/2016 |
| CN | 206747049 U | | 12/2017 |
| CN | 111866068 A | | 10/2020 |
| CN | 112418548 A | | 2/2021 |
| CN | 113267828 A | * | 8/2021 | ............. G01V 11/00 |

* cited by examiner

*Primary Examiner* — Randolph I Chu
(74) *Attorney, Agent, or Firm* — ScienBiziP, P.C.

(57) ABSTRACT

A checking mechanism for workshop security applying a method for workshop security comprises a transmission device, a recording device, a storage subassembly and a control subassembly. The transmission device comprises a first end (115) and a second end (116). The recording device records personnel and objects in their possession through a security check process, to establish a correspondence. The storage subassembly stores the information comprising personnel and their objects. The control subassembly is used for controlling the recording device to record and store the information to the storage subassembly. The control subassembly can retrieve the information recorded by the recording device to detect a certain person's correspondence to the certain object.

2 Claims, 5 Drawing Sheets

CHECKING MECHANISM FOR WORKSHOP SECURITY AND METHOD FOR SECURITY INSPECTION

FIELD

The subject matter relates to workplace security and security method.

BACKGROUND

Certain objects may be, or should be, in possession of certain staff members. In some situation, it may be forbidden to carry objects which are not work related in and out of the workshop. Existing technology may not timely confirm whether people and objects correspond before entering a workshop. Existing technology also may not check people and objects after problems arise. Therefore, there is an urgent need for an efficient workshop security inspection mechanism.

DETAILED DESCRIPTION

The following descriptions refer to the attached drawings for a more comprehensive description of this application. Sample embodiments of this application are shown in the attached drawings. However, this application can be implemented in many different forms and should not be construed as limited to exemplary embodiments set forth herein. These exemplary embodiments are provided to make this application thorough and complete, and to adequately communicate the scope of this application to those skilled in the field. Similar diagram tags represent the same or similar components.

The terms used herein are intended only to describe the purpose of particular exemplary embodiments and are not intended to limit this application. As used herein, the singular forms "one", "one" and "the" are intended to include the plural as well, unless the context otherwise clearly indicates it. In addition, when used herein, the words "include" and/or "include" and/or "have", integers, steps, operations, components and/or components, without excluding the existence or addition of one or more other features, regions, integers, steps, operations, components, components and/or groups thereof.

Unless otherwise defined, all terms used herein (including technical and scientific terms) have the same meaning as would normally be understood by ordinary technicians in the field of this application. In addition, unless expressly defined in the context, terms such as those defined in a general dictionary shall be construed to have meanings consistent with those in the relevant technology and in the content of this application, and shall not be construed to have idealistic or overly formal meanings.

Examples of embodiments are described below in combination with the attached drawings. It should be noted that the components depicted in the attached drawings may not be shown to scale. The same or similar components will be assigned the same label or similar representation.

The following is a detailed description of the specific implementation of this application by referring to the attached drawings.

Figure 1:
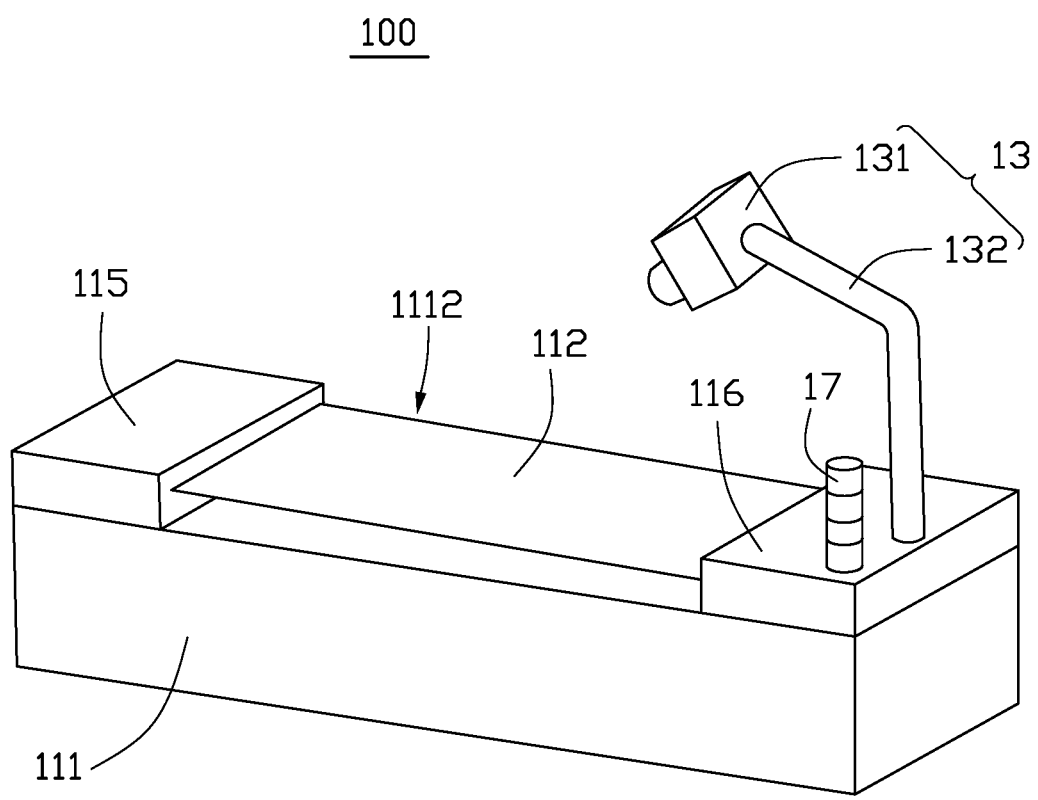
FIG. 1 is a structure view of a checking mechanism for workshop security according to an embodiment of the present disclosure.
Figure 2:
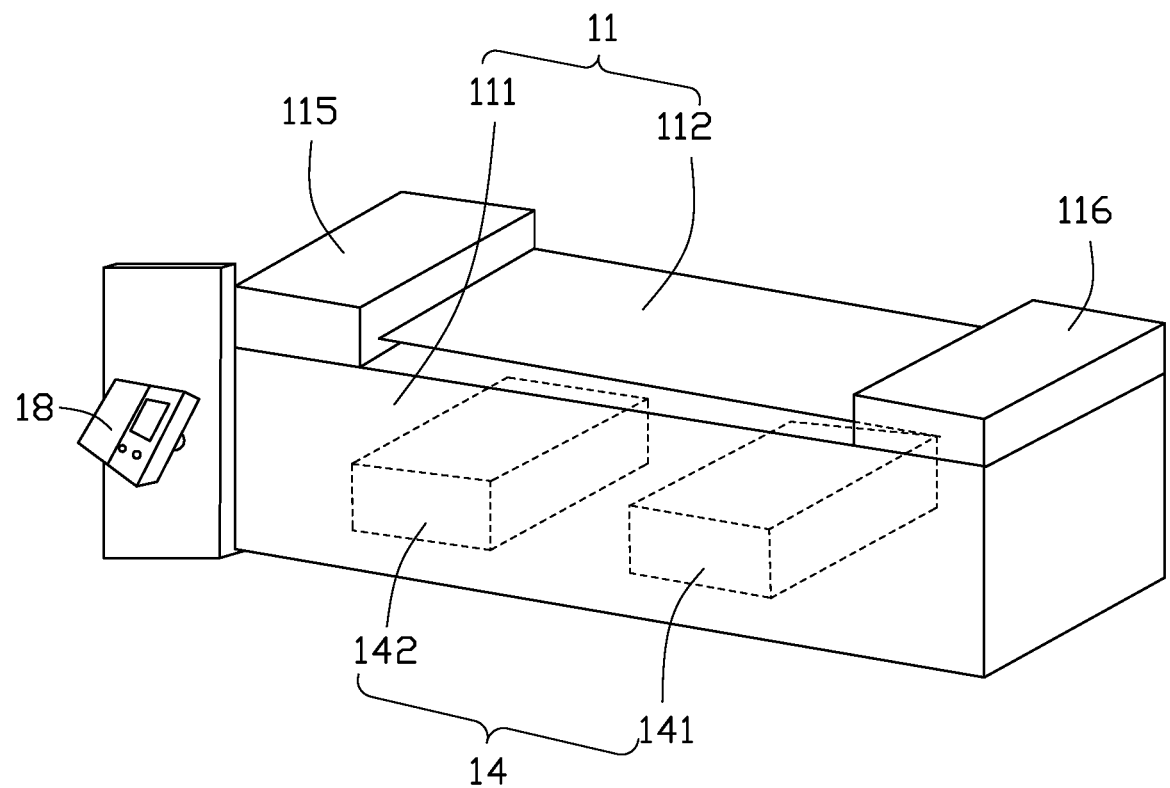
FIG. 2 is a structure view of a checking mechanism for workshop security according to another embodiment of the present disclosure.
Figure 3:
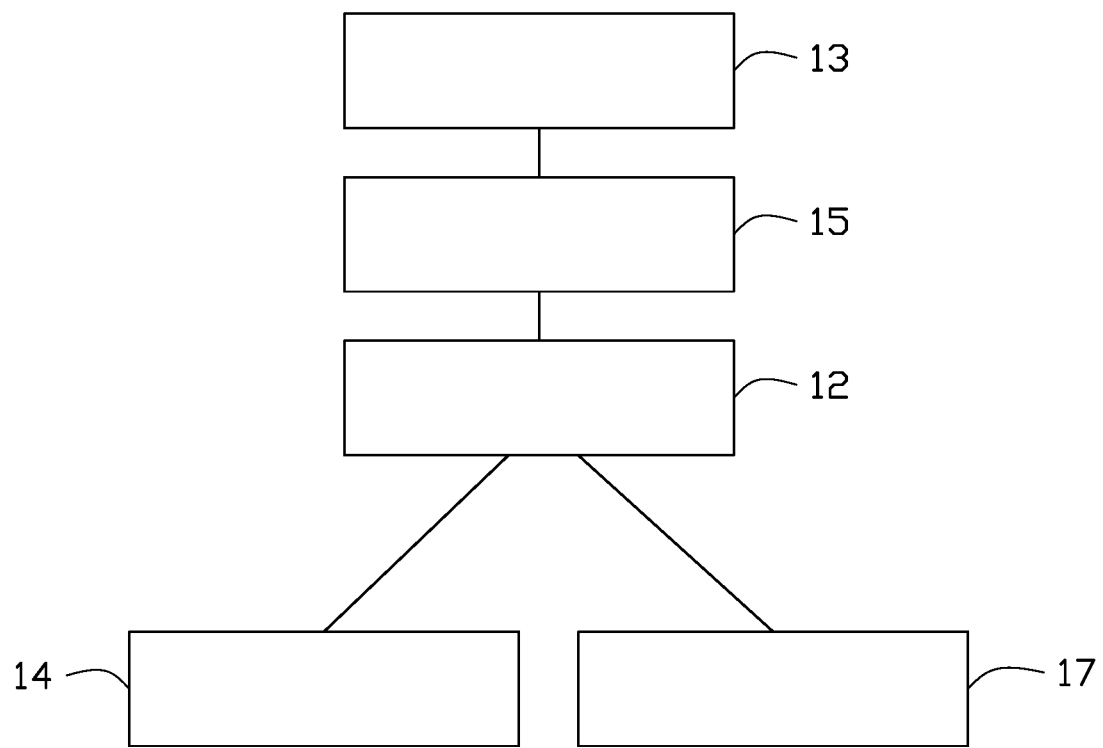
FIG. 3 is a view of working principles of the checking mechanism for workshop security according to an embodiment of the present disclosure.

FIG. 1 to FIG. 3 show the checking mechanism for workshop security 100 as including:

A transmission device 11, wherein the transmission device 11 comprises a first end 115 and a second end 116, an object in question is conveyed from the first end 115 to the second end 116.

A recording device 13 is used to record the personnel and objects in their possession through a security check process, so that correspondence between the personnel and objects can be established.

A storage subassembly 15 for storing the information recorded by the recording device 13, the information comprising personnel and objects.

A control subassembly 12 for controlling the recording device 13 to record and store the information to the storage subassembly 15.

Wherein, the control subassembly 12 retrieves the information recorded by the recording device 13 in the storage subassembly 15 to detect whether the person is corresponding to the object.

In this embodiment, whether the personnel and the objects correspond to each other refers to whether the recording device 13 records whether the objects carried by the same personnel to be tested are consistent upon entering and upon exiting the workshop, that is, the recording device 13 records the objects carried upon entry of the person to be tested and whether the items being carried upon exiting the workshop are the same as the items brought into the workshop.

As shown in FIG. 1, the transmission device 11 includes a transmission component 112 and a frame 111. The transmission component 112 is arranged in the frame 111. The first end 115 and the second end 116 are arranged in the transmission component 112. The transmission component 112 is electrically connected to the control subassembly 12.

The transmission component 112 includes a transmission belt 1121 driven by electricity. The objects are placed on the transmission belt 1121. The objects are conveyed from the first end 115 to the second end 116. The frame 111 is provided with a through slot 1112, and the transmission belt 1121 is installed in the through slot 1112, so that the two side walls protect the article when on the transmission belt 1121.

The recording device 13 comprises an image capturing device 131, and the image capturing device 131 is positioned at the transmission device 11, and the image capturing device 131 captures images of personnel and of objects.

Further, the recording device 13 further includes a bracket 132 for fixing the image pickup device 131. One end of the bracket 132 away from the image pickup device 131 can be installed on the frame 111 close to the first end 115 or the second end 116, so that a person is shown in the same image as the image of the object.

In this embodiment, the number of image collectors 131 is determined according to needs, which can be one, or a plurality of the same or different image collectors 131, and the image collectors 131 can be cameras.

In other embodiments, the recording device 13 is a camera or other device with an image capture function.

After the recording device 13 completes the information recording, the information is sent to the storage component 15 for storage, so that the information stored in the storage component 15 can be retrieved and checked later when necessary.

In this embodiment, as shown in FIG. 2 and FIG. 3, the workshop security inspection mechanism 100 is also provided with a face recognition device 18. The face recognition device 18 is arranged at the first end 115 of the frame 111. The face recognition device 18 is electrically connected to the control component 12 or/and the storage component 15. Specifically, after the person being checked is recorded by the face recognition device 18 before being matched with an object in question, a signal can be sent to the control component 12, and the control component 12 controls the recording device 13 to prepare to record the information of the object in question and the person to be matched after receiving the signal. After the signal is sent to the control component 12, the identified personal information of the person to be matched is sent to the storage component 15. In this way, the recording device 13 only records the items. Of course, the recording device 13 can also record the person to be matched and the object or objects in question.

As shown in FIG. 1 and FIG. 3, the checking mechanism for workshop security 100 further includes a sensing component 14 and an alarm component 17. The alarm component 17 is disposed in the transmission component 112 and is electrically connected with the control component 12. The sensing component 14 may be directly electrically connected to the alarm component 17, or the sensing component 14 may be indirectly electrically connected through the control component 12.

The sensing component 14 comprises a first sensor 141 and a second sensor 142, the second sensor 142 is used for sensing the weight of an object in question on the transmission component 112. The first sensor 141 is used for sensing the position of the object and sending a first signal to the control subassembly 12. The second sensor 142 is positioned at the transmission component 112. The first sensor 141 is positioned at the second end 116. The first sensor 141 and the second sensor 142 are electrically connected with the control subassembly 12 to control the transmission component 112.

Further, the first sensor 141 can be a position sensor, such as an ultrasonic position sensor; the second sensor 142 can be a weight sensor, which can sense the presence of an item placed on the conveyor belt 1121 in the transmission part 112 by its weight.

The alarm assembly 17 is mounted on the frame 111, and the alarm assembly 17 can be an alarm lamp, such as a four-color alarm lamp; it can also be an audible alarm device.

The control assembly 12 is preset for comparing the first threshold value of the dwell time of the first sensor 141 for sensing the item at the second end 116. The control assembly 12 is preset for comparing the second sensor 142 for sensing the weight of the item on the conveying portion 112. The control assembly 12 is preset for the second threshold, the control component 12 controls the alarm component 17 to give an alarm according to the first threshold or the second threshold being reached and exceeded.

Figure 4:
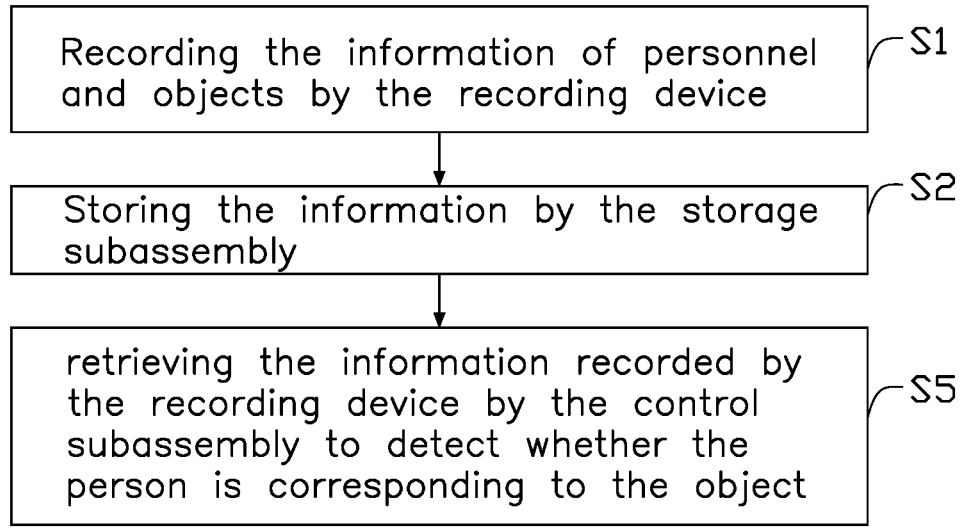
FIG. 4 illustrates a security checking method according to an embodiment of the present disclosure.

As shown in FIG. 1, FIG. 2 and FIG. 4, an example of the workflow of the workshop security inspection mechanism 100 is as follows. The person places object in question on the first end 115 of the conveyor belt 1121. The second sensor 142 senses the item and sends a second signal to the control subassembly 12. The control subassembly 12 determines that the weight of the item is greater than the second threshold according to the second signal, and the control subassembly 12 controls the alarm component 17 to give an alarm. The control subassembly 12 determines that the weight of the article is less than or equal to the second threshold according to the second signal, and the control subassembly 12 controls the transmission part 112 to start conveying the item. At the same time, the control and recording device 13 records the information of the person possessing the item, and sends the information to the storage component 15. The information is used to later check whether the person and the item correspond. The conveyor belt 1121 conveys the item from the first end 115 to the second end 116, the first sensor 141 located at the second end 116 senses the presence of the item and sends a continuous first signal to the control subassembly 12. The control component 12 receives all of the continuous first signal, and according to the time period of the signal determines the dwell time of the item at the second end 116. When the staying time of the item at the second end 116 is greater than the first threshold, the control component 12 controls the alarm component 17 to give an alarm to remind the person who has completed the process not to forget that his object has not been collected or picked up.

Furthermore, the control subassembly 12 stores a first preset threshold and a second preset threshold, the first threshold corresponds to the dwell time of the object in question at the second end 116, the second preset threshold corresponding to the weight of the object, the control subassembly 12 issues an alarm according to the result of the aforementioned comparison control and the alarm component 17.

A method for applying a security check in a workshop using the checking mechanism for workshop security comprises:

Step S1: recording the information of personnel and objects by the recording device 13;

Step S2: storing the information by the storage subassembly 15;

Step S5: retrieving the information recorded by the recording device 13 by the control subassembly 12 to detect whether the person is corresponding to the object.

During the step S1, the recording device 13 records the personnel and objects during each security check process in real time, so that the personnel and the objects correspond.

Figure 5:
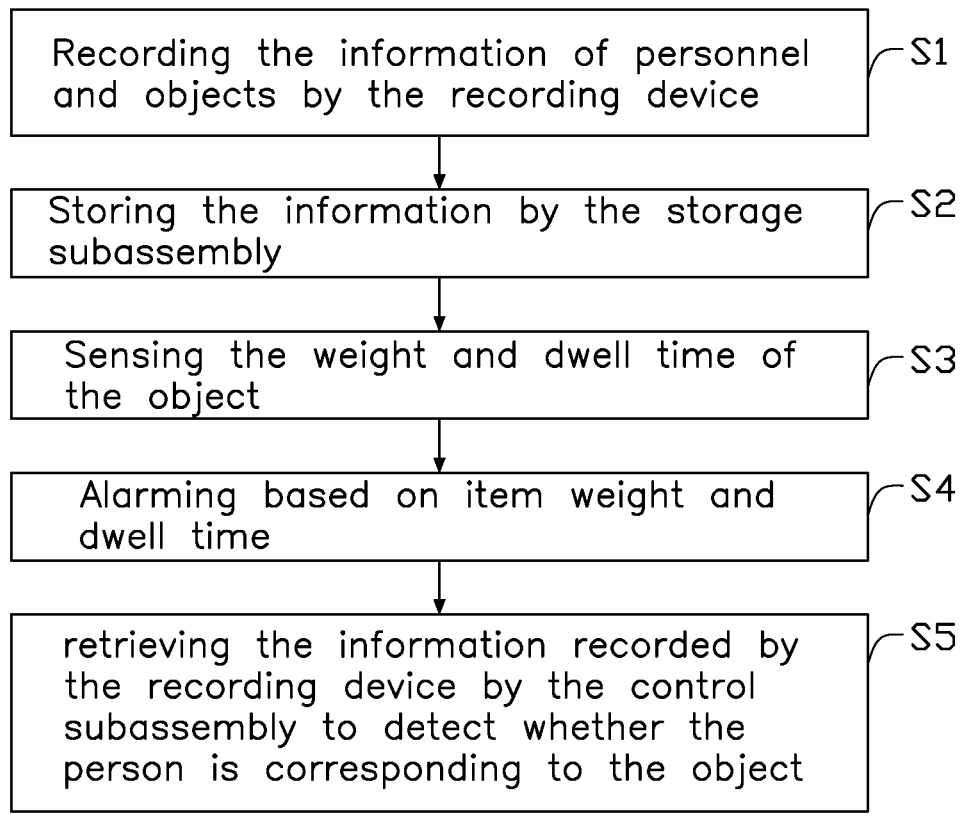
FIG. 5 illustrates a security checking method according to another embodiment of the present disclosure.

As shown in FIG. 5, after the Step S2, the checking mechanism for workshop security further comprises Step S3. During the step S3, the checking mechanism for workshop security further comprises a sensing component 14, the sensing component 14 comprises a first sensor 141 and a second sensor 142. The first sensor 141 is positioned at the conveying portion 112, the second sensor 142 is positioned at the second end 116. The first sensor 141 and the second sensor 142 are electrically connected to the control subassembly 12.

During the step S3: sensing the weight and dwell time of the object. Sensing the weight of the object on the transmission device 11 and sending a second signal to the control subassembly 12 by the second sensor 142; the control subassembly 12 receives the second signal and controls the operation of the transmission device 11 to transmit the object from the first end 115 to the second end 116. The first sensor 141 is used to sense the position of the item and send the first signal; specifically, the first sensor 141 senses the item transmitted to the second end 116 and sends the second signal to the control component 12, and the control component 12 receives the first signal and control the transmission device 11 to stop working. During this process, the first sensor 141 continues to send the first signal to the control component 12 to indicate the existence of the article, and the control component 12 determines the time of the continuous sending of the first signal to determine that the article is located in the second the dwell time at end 116.

As shown in FIG. 5, between the Step S3 and Step S5, the checking mechanism for workshop security further comprises Step S4. During the step S4: alarming based on item weight and dwell time. Sensing the position of each the objects by a first position sensor and sending a first signal to the control subassembly 12 when the object is positioned at a preset position.

The control subassembly 12 receives the first signal and control the transmission device 11 to stop working.

Furthermore, the checking mechanism for workshop security further comprises an alarm component 17, the alarm component 17 is electrically connected to the control subassembly 12.

During the step S4, the control component 12 presets a first preset threshold and a second preset threshold, wherein the first threshold value is a dwell time threshold value, and the second threshold value is a weight threshold value.

Determining whether a dwell time of the item is greater than the first preset threshold; Determining whether a weight of the item is greater than the second preset threshold; Determine whether to issue an alarm according to the comparison result.

Specifically, the control component 12 compares the weight of the article with the second threshold, and when the comparison result is that the weight of the article is greater than the second threshold, the control component 12 controls the alarm component 17 to give an alarm, and controls the transmission device 11 to stop working; If the weight of the article is less than or equal to the second preset threshold, the alarm component 17 does not alarm, and the control component 12 controls the conveying device 11 to work so that the conveyor belt 1121 conveys the article from the first end 115 to the second end 116. The control component 12 compares the dwell time of the article with the first preset threshold, and when the comparison result is that the dwell time of the article is greater than the first preset threshold, the control component 12 controls the alarm component 17 to give an alarm; when the dwell time of the article is less than or equal to the first preset threshold, the alarm component 17 does not alarm.

What is claimed is:

1. A method for security inspection using a checking mechanism for workshop security, the checking mechanism for workshop security comprises a transmission device (11), a recording device (13), a storage subassembly (15) and a control subassembly (12), the transmission device (11) comprises a first end (115) and a second end (116); the recording device (13) and the storage subassembly (15) are electrically connected the control subassembly (12), the method for security inspection comprising:

recording information of personnel and information of objects by the recording device (13);

storing the information of personnel and/or objects by the storage subassembly (15);

retrieving the information recorded by the recording device (13) by the control subassembly (12) to detect whether the information of the personnel corresponds to the information of objects;

wherein the checking mechanism for workshop security further comprises a sensing component (14), the sensing component (14) comprises a first sensor (141) and a second sensor (142), the first sensor (141) is positioned at a second end (116), the second sensor (142) is positioned at the transmission device (11), the transmission device (11), the first sensor (141) and the second sensor (142) are electrically connected to the control subassembly (12);

between the recording and the retrieving, the method further comprises:

sensing a weight of the object on the transmission device (11) and sending a second signal to the control subassembly (12) by the second sensor (142); the control subassembly (12) receives the second signal and controls the transmission device (11) to transmit the information of objects from the first end (115) to the second end (116);

sensing a position of each the objects by a first position sensor and sending a first signal to the control subassembly (12) when the object is sensed to be at a preset position; and the control subassembly (12) receives the first signal and control the transmission device (11) to stop working;

the checking mechanism for workshop security further comprises an alarm component (17), the alarm component (17) is electrically connected to the control subassembly (12); the method for security inspection further comprises:

determining whether a dwell time of the item is greater than a first preset threshold;

determining whether a weight of the item is greater than a second preset threshold;

controlling the alarm component (17) alarm when the dwell time of the object is greater than the first threshold; and the control subassembly (12) controlling the alarm module (17) to alarm and controlling the transmission device (11) to stop working when the weight of the object is greater than the second preset threshold, the control subassembly (12) further controlling the alarm subassembly (17) to alarm and the transmission device (11) to stop working.

2. The method for security inspection of claim 1, wherein the recording device (13) records the information of personnel and information of objects during each security check process in real time, so that the information of personnel and the information of objects correspond.

* * * * *